United States Patent [19]
Dee et al.

[11] Patent Number: 6,038,108
[45] Date of Patent: Mar. 14, 2000

[54] MAGNETIC TAPE HEAD ASSEMBLY HAVING SEGMENTED HEADS

[75] Inventors: Richard H. Dee; James C. Cates, both of Louisville, Colo.

[73] Assignee: Storage Technology Corporation, Louisville, Colo.

[21] Appl. No.: 08/975,645

[22] Filed: Nov. 21, 1997

[51] Int. Cl.[7] .................................................. G11B 5/265
[52] U.S. Cl. ............................................................ 360/121
[58] Field of Search ................................... 360/113, 119, 360/121, 122

[56] References Cited

U.S. PATENT DOCUMENTS

| | | | |
|---|---|---|---|
| 4,375,656 | 3/1983 | Radman, Jr. et al. | 360/102 |
| 4,479,158 | 10/1984 | Froehlich et al. | 360/130.1 |
| 4,589,042 | 5/1986 | Anderson | 360/125 |
| 4,685,005 | 8/1987 | Fields, Jr. | 360/53 |
| 5,034,838 | 7/1991 | Brock et al. | 360/122 |
| 5,142,768 | 9/1992 | Aboaf et al. | 360/119 |
| 5,203,119 | 4/1993 | Cole | 451/11 |
| 5,220,473 | 6/1993 | Brock et al. | 360/121 |
| 5,264,981 | 11/1993 | Campbell et al. | 360/126 |
| 5,293,285 | 3/1994 | Leonhardt et al. | 360/95 |
| 5,296,993 | 3/1994 | Aboaf et al. | 360/126 |
| 5,302,461 | 4/1994 | Anthony | 360/113 |
| 5,345,341 | 9/1994 | Durland | 360/15 |
| 5,602,703 | 2/1997 | Moore et al. | 360/121 |
| 5,751,527 | 5/1998 | Sundaram et al. | 360/122 |

OTHER PUBLICATIONS

F. William Hahn, Jr., *Historical Perspective of Tape Head Contours*, IBM Corporation, Tucson, Arizona.

Richard Dee and James Cates, *Designing write heads for high–density tape*, Data Storage, pp. 43–48, Oct. 1996.

Brahim Lekmine, *Recording Channel and Data Detection in Magnetic Tape Drives*, Proceedings, SPIE–The International Society for Optical Engineering, High Density Data Recording and Retrieval Technologies, 23–24 Oct. 1995, vol. 2604, pp. 176–191.

Richard C. Schneider, *Design Methodology for High Density Read Equalization*, Proceedings, SPIE–The International Society for Optical Engineering, High Density Date Recording and Retrieval Technologies, Oct. 23–24, 1995, vol. 2604, pp. 200–209.

Priyadarshee et al., *Survey of digital transport servo systems*, Proceedings, SPIE–The International Society for Optical Engineering, High Density Data Recording and Retrieval Technologies, Oct. 23–24, 1995, vol. 2604, pp. 210–217.

Eric Baugh et al., *Head/tape interface*, Proceedings, SPIE–The International Society for Optical Engineering, High Density Data Recording and Retrieval Technologies, Oct. 23–24, 1995, vol. 2604, pp. 158–164.

James A. Bain, *Recording heads: write heads for high–density magnetic tape*, SPIE–The International Society for Optical Engineering, High Density Data Recording and Retrieval Technologies, Oct 23–24, 1995, vol. 2604, pp. 165–175.

Jim Eaton, *Magnetic tap trends and futures*, Proceedings, SPIE–The International Society for Optical Engineering, High–Density Data Recording and Retrieval Technologies, Oct. 23–24, 1995, vol. 2604, pp. 146–157.

*Primary Examiner*—David D. Davis
*Attorney, Agent, or Firm*—Brooks & Kushman P.C.

[57] ABSTRACT

A magnetic tape head assembly is disclosed for use with a magnetic tape storage medium. The assembly includes an interior tape head module having a magnetic gap with 16 or more tape head elements, and a first exterior tape head module adjacent one side of the interior module, the first exterior module having a magnetic gap with 16 or more tape head elements. The assembly also includes a second exterior tape head module adjacent the other side of the interior module, the second exterior module having a magnetic gap with 16 or more recording elements. The distances between consecutive magnetic gaps of the interior and exterior modules are each approximately 60 microns, and the interior and exterior modules together define a semi-circular tape interface contour. In the preferred embodiment, the interior module is a write head with 16 write elements, and the exterior modules are each read heads with 16 data read elements and 6 servo read elements.

8 Claims, 4 Drawing Sheets

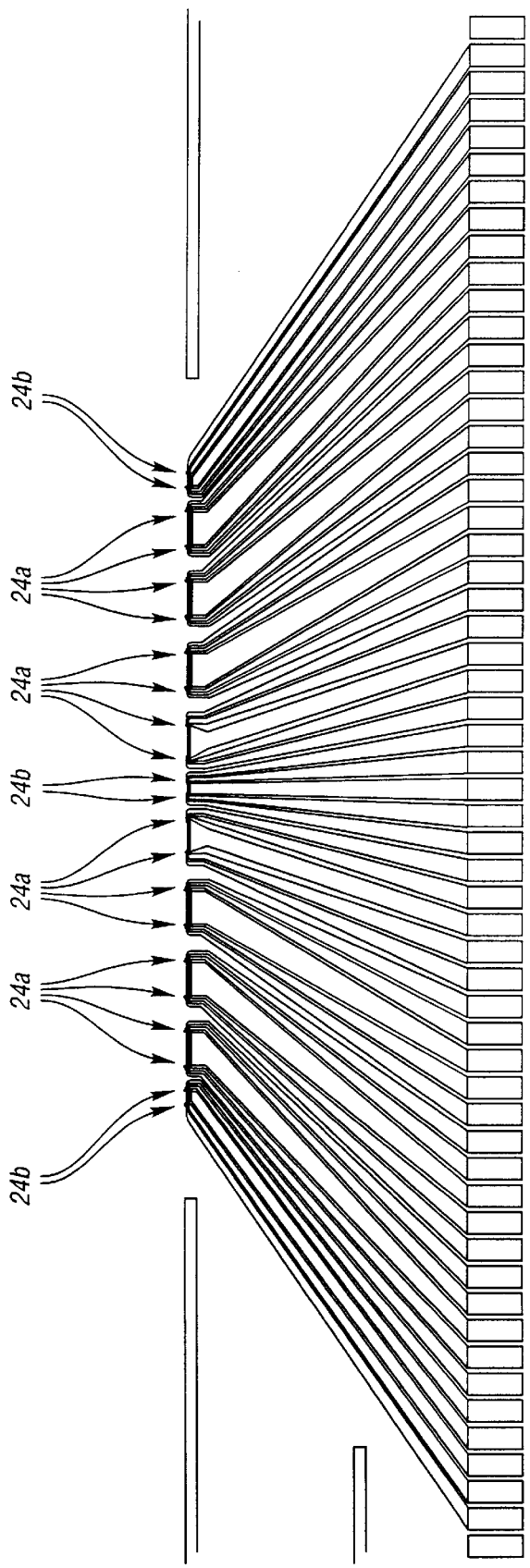

MAGNETIC TAPE HEAD ASSEMBLY HAVING SEGMENTED HEADS

TECHNICAL FIELD

The present invention relates to a magnetic tape head assembly with multiple tape head modules designed for bi-directional, high speed, high density tape storage applications.

BACKGROUND ART

An important and continuing goal in the data storage industry is that of increasing the density of data stored on a medium. For tape storage systems, that goal has lead to increasing the track density in recording tape heads, and decreasing the thickness of the magnetic tape medium. However, the development of small footprint, higher performance tape drive systems has created various problems in the design of a tape head assembly for use in such systems.

Such problems include recording high density patterns on high coercivity tape media. In addition, the tape head assembly must perform read while write operations in both forward and backward direction of tape motion at high tape speeds. Moreover, the tape head assembly must be moveable perpendicular to the direction of tape motion to allow multiple passes of the tape with the head in different cross tape locations. Further, the tape head assembly must provide active track following servo capability. Still further, as the number of recording or reproducing elements on a tape head increases, the spacing between adjacent elements in the tape head is much tighter. In addition, the relatively poor guiding of the tape requires that the spacing between a write element and a read verify in the tape head assembly must decrease in order to ensure that the read is located on the proper written track.

Thus, there exists a need for a multi-element, thin film tape head assembly for use in a tape drive that will use high coercivity half-inch wide tape media (e.g., >1600 Oe Metal Particle) and a high recording density (e.g., 70 kfci base with 200–400 kfci write equalization recording). Such a tape head assembly would perform read while write operations in both forward and backward direction of tape motion at a tape speed of 2–4 m/s, and would be moveable perpendicular to the direction of tape motion to allow multiple passes of the tape. Still further, such a tape head assembly would include 16 tape head elements, would provide active track following servo capability using 6 servo reading elements, and would have alignment between read and write elements of better than 5 µm.

SUMMARY OF THE INVENTION

Accordingly, a principle object of the present invention is to provide an improved bidirectional, high speed, multi-gap, high density tape head assembly.

According to the present invention, then, a magnetic tape head assembly is provided for use with a magnetic tape storage medium. The assembly comprises an interior tape head module having a magnetic gap provided therein, the interior module having at least 16 tape head elements along the magnetic gap, and a first exterior tape head module having a magnetic gap provided therein, the first exterior module being disposed adjacent one side of the interior module, the first exterior module having at least 16 tape head elements along the magnetic gap. The assembly further comprises a second exterior tape head module having a magnetic gap provided therein, the second exterior module being disposed adjacent to another side of the interior module, the second exterior module having at least 16 tape head elements along the magnetic gap. The distances between consecutive magnetic gaps of the interior and exterior modules are each approximately 0.060 inches (60 mils), and the interior and exterior modules together define a tape interface contour.

These and other objects, features and advantages will be readily apparent upon consideration of the following detailed description in conjunction with the accompanying drawings.

BRIEF DESCRIPTION OF THE DRAWINGS

FIGS. 3a and 3b are views of alternative embodiments of a multi-element, thin film read head for use in the present invention.

DETAILED DESCRIPTION OF THE INVENTION

Figure 1:
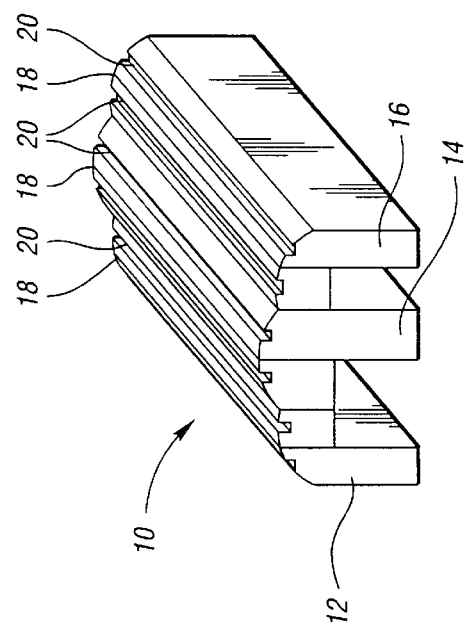
FIG. 1 is a perspective view of one embodiment of the multi-track, bi-directional thin film tape head assembly of the present invention.

Referring now to FIGS. 1–3, the preferred embodiment of the present invention will now be described in detail. In that regard, FIG. 1 is a perspective view of one embodiment of the multi-element, bi-directional thin film tape head assembly of the present invention, denoted generally by reference numeral 10.

As seen therein, tape head assembly (10) is a three segment head comprising a first read head (12), a write head (14), and a second read head (16). In that regard, as will be described in detail below in conjunction with FIGS. 2 and 3, write head (14) contains 16 thin film write elements (not shown) positioned symmetrically between read heads (12, 16), each containing 22 biased magneto-resistive (MR) read elements (not shown) In this embodiment, then, tape head assembly (10) is a read/write/read design. While preferred, such a read/write/read design is not required for the present invention.

Still referring to FIG. 1, as is well known in the art, each read and write head (12, 14, 16) includes a magnetic gap (18). In that regard, the spacing between gaps (18) of read head (12) and write head (14), as well as write head (14) and read head (16) (gap-to-gap spacing), is 60 mils to aid reducing the effect of azimuth on offtrack issues. The contour of tape head assembly (10) is shaped for bi-directional operation by using cylindrical surfaces and transverse air bleed slots (20). As will be shown in greater detail below with reference to FIGS. 2 and 3, the read data elements are arranged in 4 groups of 4 or 2 groups of 8 to allow the servo tracks and readers to be positioned in between.

Referring still to FIG. 1, the three head modules (12, 14, 16) are preferably fixed into an aluminum frame (not shown) with electrical connections preferably made by direct attached thermosonic bonding (not shown). In that regard, the cables are preferably single layer shielded copper/Kapton based "flex" cables. It should be noted that this design may also include shields (not shown) or air ducts (not shown) between modules (12, 14, 16).

As previously stated, the read/write/read configuration described above is preferred, but alternatives are possible.

These include a write/read/write configuration, or an interleaved read/write two module arrangement. However, the separation of reads and writes via the three module head (as opposed to an interleaved design) gives lower feedthrough and an easier thin film head manufacturing process. Each side can be independently optimized and the yield of one does not compromise the yield of the other. In that regard, the thin film manufacturing process for the tape heads for use in such an assembly requires high precision and is very time-consuming. It is therefore desirable to design a tape head assembly that minimizes the complexity of the process. This is best accomplished by minimizing the number of tape head modules in the tape head assembly and by allowing for maximum tolerances in the assembly of the required modules.

While assembly of a three module head is more complex than a two module head, the two module design involves interleaving the reads and writes in the thin film area, thereby increasing the process complexity, as well as the flex circuit and connector density. For three module assemblies, the cable and card (and crosstalk) complexity is much reduced as separation of the reads and writes is done in the head rather than in the cable or on the card. Moreover, locating the servo readers in the read (only) gap provides low feedthrough from the write when writing. In contrast, using reads in the write gap has high feedthrough and complicates the thin film head manufacturing process.

Moreover, using servo reads in the read gap gives an error in the write position due to the read/write module alignment. This is an important consideration in a total write Track Mis-Registration budget. In addition, use of two read heads in a read/write/read design, rather than a single read head in a write/read/write design, allows for servo averaging from both read modules to eliminate the azimuth contribution to the TMR on write, but not the base read to write alignment offset. Still further, on readback, the read servo elements are well aligned to the data readers.

Figure 2A:
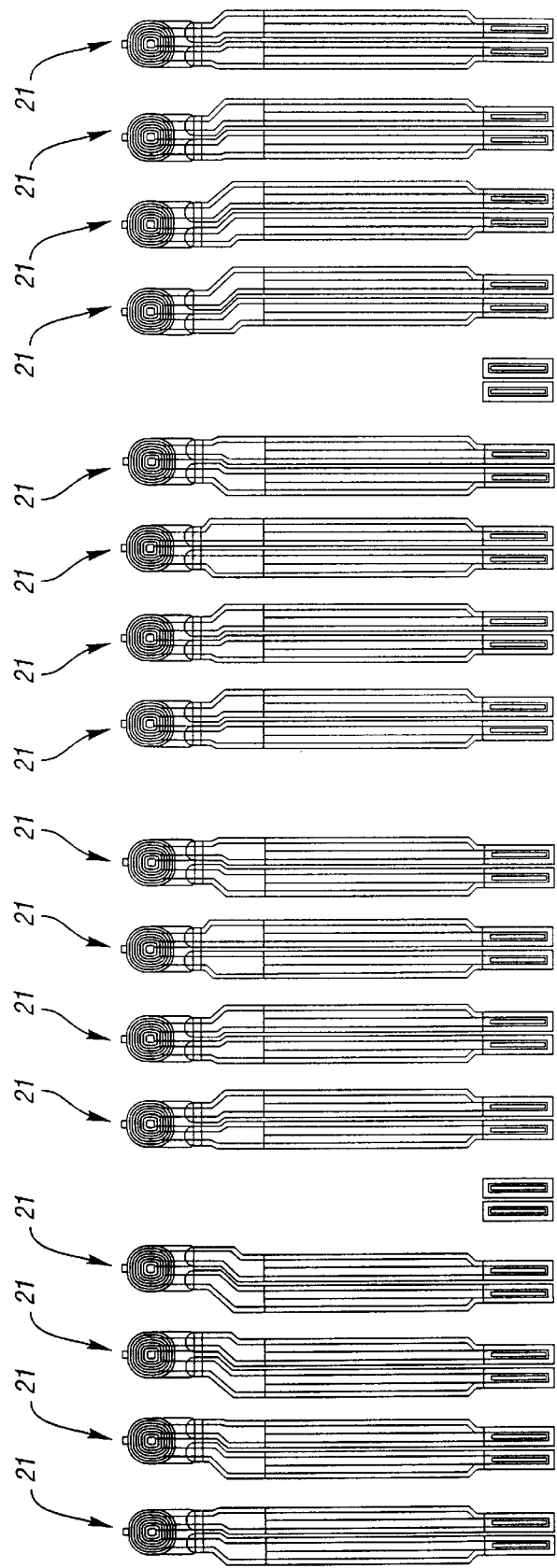
FIGS. 2a and 2b are views of alternative embodiments of a multi-element, thin film write head for use in the present invention.
Figure 2B:
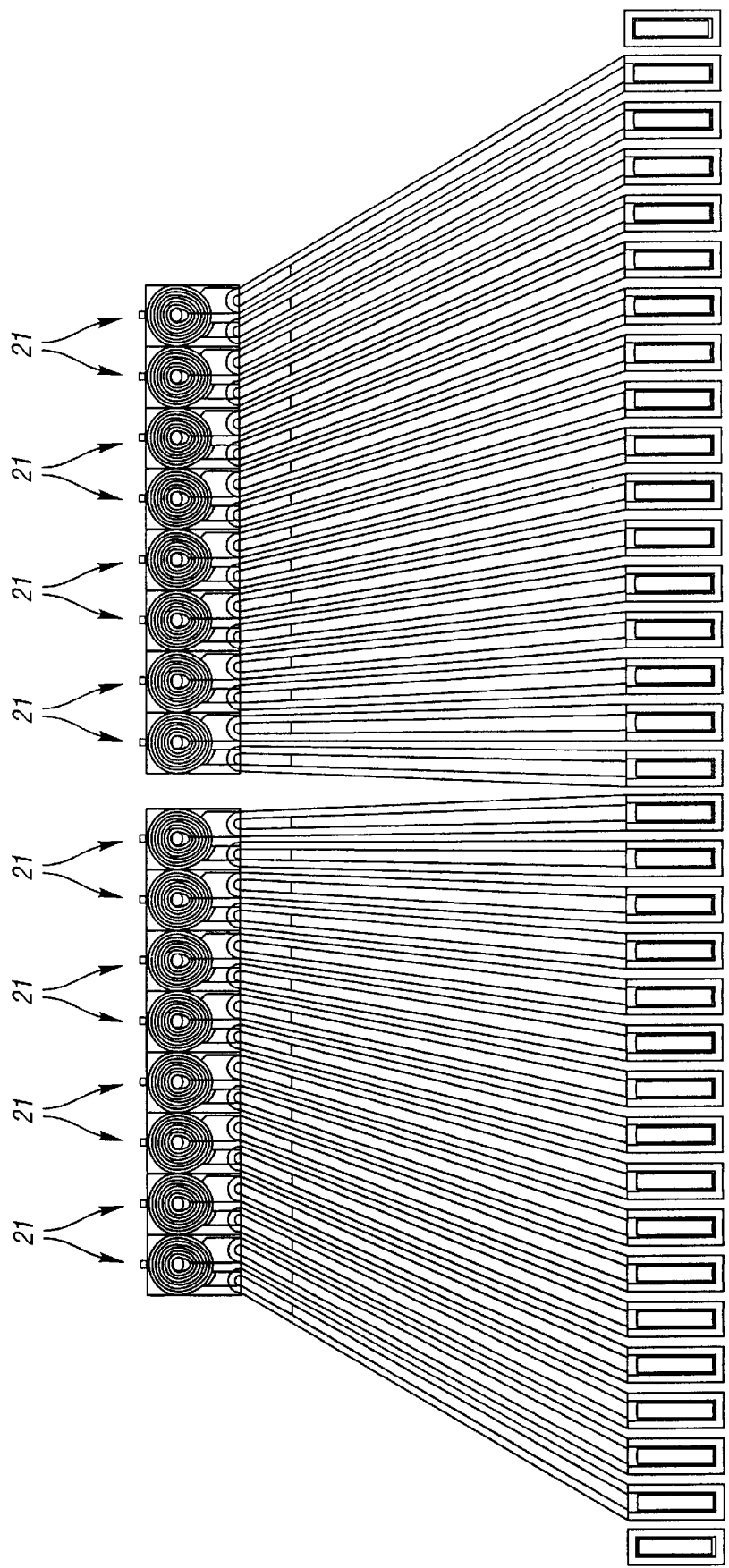
Figure 3A:
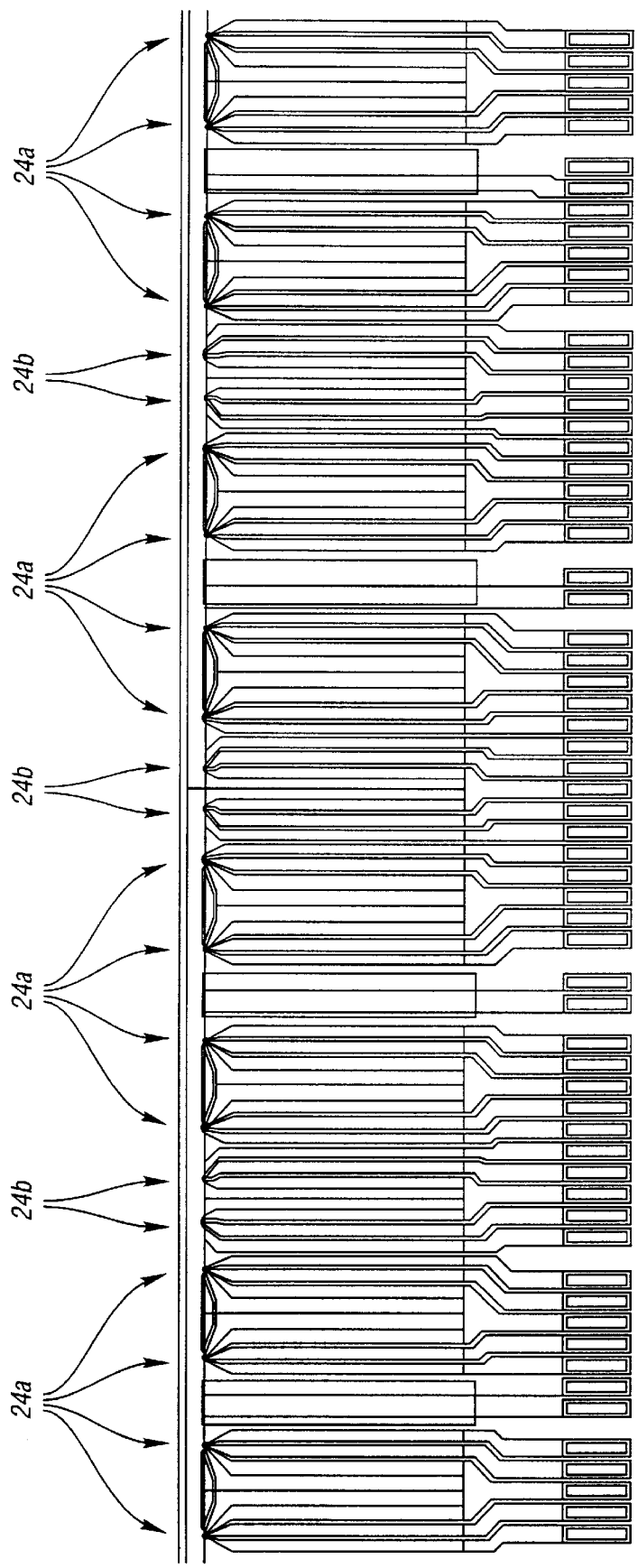

Referring next to FIGS. 2 and 3, views of alternative embodiments of multi-element, thin film read and write heads for use in the present invention are shown. In that regard, FIGS. 2a and 2b depict single and dual band embodiments of write head (14) of FIG. 1. In that same regard, FIGS. 3a and 3b depict single and dual band embodiments of read heads (12, 16) of FIG. 1. The dual band embodiments of read and write heads (12, 14, 16) of FIG. 1 are designed to decrease the affect of tape dimensional instability over time by subdividing the tape into two halves.

As seen in FIGS. 2a and 2b, write head (14) of FIG. 1 includes 16 write elements (21). Each write element (21) is a 5 or 6 turn inductive device with Cobalt-Zirconium-Tantalum poles constructed on an Aluminum-Titanium-Carbide or a Nickel-Zinc ferrite base. The pole width that defines the track width on tape is 36 $\mu$m wide and the gap length is approximately 0.60–0.75 $\mu$m. As previously described, write elements (21) may be arranged as a single band of 4 groups of 4 write elements (21) to allow the servo tracks and readers to be positioned in between (FIG. 2a). Alternatively, write elements (21) may be arranged in 2 bands of 8 write elements (21) (FIG. 2b), again to account for tape dimensional instability over time by subdividing the tape into two halves. In this embodiment, each band has an approximately 0.25 inch span for two positions across a 0.5 inch tape. In that regard, the tape head assembly of the present invention is designed for use in a 0.5 inch, two reel cassette (cartridge). In either embodiment, write head also includes lapping sensors (not shown) at each end thereof.

Similarly, as seen in FIGS. 3a and 3b, read heads (12, 16) of FIG. 1 include 22 read elements (24a, 24b). Each read element (24a, 24b) is a coupled element (dual stripe) magneto-resistive (MR) element sandwiched between two Nickel-Zinc ferrite blocks that act as magnetic shields. The active element width is approximately 16–28 $\mu$m and the shield-to-shield spacing is approximately 0.4–0.55 $\mu$m. Like write elements (21), read elements (24a, 24b) may be arranged as a single band of 4 groups of 4 read elements (24a), with 6 servo tracks and read elements (24b) positioned in between (FIG. 3a). Alternatively, read elements (24a, 24b) may be arranged in dual bands of 2 groups of 8 data read elements (24a), with 6 servo tracks and read elements (24b) positioned in between (2-8-2-8-2 format) (FIG. 3b). Once again, this arrangement is designed to account for tape dimensional instability over time by subdividing the tape into two halves. It should also be noted that the servo read elements for use in the present invention may be provided with different throat heights to allow for reading of lower density servo signals.

In either embodiment (FIGS. 2a and 2b, or 3a and 3b), the tape head assembly of the present invention uses 16 tracks at a time, with 12 active servo readers. It should be noted that the tape head assembly of the present invention utilizes a common ground for pairs of tracks (not shown), rather than a common ground for all tracks. In such a fashion, the tape head assembly of the present invention lessens ground loop problems. Moreover, this layout in pairs of tracks improves packing density. The three tape head modules, each with 16 active tracks, provides a unique format capability of up to 288 tracks on a 0.5 inch tape. Such high density creates the need for the servo reading capability and the three module tape head assemblies described above, particularly the read/write/read configuration of the preferred embodiment.

It should also be noted that the tape head assembly of the present invention is designed for use with various features which are shown and described in U.S. patent application Ser. No. 08/943,361 entitled "Recording Head Element With Improved Coil Tap And Method For Manufacturing Same"; Ser. No. 08/909,533 entitled "High Density Thin Film Coupled Element Read Head And Method For Manufacturing Same"; Ser. No. 08/940,185 entitled "Transverse Slotted Magnetic Tape Head Assembly For High Speed, High Density Applications"; Ser. No. 08/943,722 entitled "Multitrack Coupled Element Read Head And Method For Manufacturing Same"; Ser. No. 08/850,039 entitled "Heat Exchangeable Thin-Film Recording Head Element And Method For Manufacturing Same"; Ser. No. 08/939,773 entitled "Magnetic Head Assembly"; and Ser. No. 08/939,937 entitled "Lapping Sensor For Thin Film Recording Elements And Method For Manufacturing Same". Each of those applications are assigned to the assignee of the present application, and are incorporated herein by reference.

As is readily apparent from the foregoing description, then, the present invention provides an improved bi-directional, high speed, multi-gap, high density tape head assembly. More specifically, the present invention provides a multi-element, thin film tape head assembly for use in a tape drive that will use high coercivity half-inch wide tape media and a high recording density. The tape head assembly of the present invention will perform bi-directional read while write operations at a tape speed of 2–4 m/s, and will be moveable perpendicular to the direction of tape motion to allow multiple passes of the tape. Still further, the tape head assembly of the present invention includes 16 recording elements, provides active track following servo capability using 6 servo reading elements, and has alignment between read and write elements of better than 5 $\mu$m. As also previously discussed, the magnetic tape head assembly of the present invention is suitable for use with any number of read and/or write heads in any combination.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A magnetic tape head assembly for use with a magnetic tape storage medium, the assembly comprising:

a cylindrically shaped interior tape head module having a magnetic gap provided therein, the interior module including a write head having 16 tape head elements along the magnetic gap;

a cylindrically shaped first exterior tape head module having a magnetic gap provided therein, the first exterior module being disposed adjacent one side of the interior module, the first exterior module including a read head having 22 tape head elements including servo read elements along the magnetic gap; and a cylindrically shaped second exterior tape head module having a magnetic gap provided therein, the second exterior module being disposed adjacent to another side of the interior module, the second exterior module including a read head having 22 tape head elements including servo read elements along the magnetic gap;

wherein the 16 tape head elements of the write head of the interior module are positioned symmetrically between the exterior modules and, wherein the distances between consecutive magnetic gaps of the interior and exterior modules are each approximately 60 mils, and the interior and exterior modules together define a cylindrically shaped tape interface contour.

2. The magnetic tape head assembly of claim 1 wherein each of the interior and exterior modules are provided with a transverse slot on each side of the magnetic gaps therein.

3. The magnetic tape head assembly of claim 1 wherein the 22 tape head elements of the read head of each exterior module comprises 22 read elements including 16 data read elements and 6 servo read elements, the 22 read elements being arranged across an approximately 0.5 inch span of the magnetic gap in a format of 4 data read elements, 2 servo read elements, 4 data read elements, servo read elements, 4 data read elements, 2 servo read elements, and 4 data read elements.

4. The magnetic tape head assembly of claim 3 wherein the 22 read elements each comprise a coupled, dual stripe, magneto-resistive element.

5. The magnetic tape head assembly of claim 4 wherein the 22 read elements each comprise a coupled, dual stripe, magneto-resistive element.

6. The magnetic tape head assembly of claim 1 wherein the 22 tape head elements of the read head of each exterior module comprises 22 read elements including 16 data read elements and 6 servo read elements, the 22 read elements being arranged across an approximately 0.25 inch span of the magnetic gap in a format of 2 servo read elements, 8 data read elements, 2 servo read elements, 8 data read elements, and 2 servo read elements.

7. The magnetic tape head assembly of claim 1 wherein the 16 tape head elements of the write head of the interior module comprises 16 write elements arranged across an approximately 0.5 inch span of the magnetic gap in a format of 4 groups of 4 write elements.

8. The magnetic tape head assembly of claim 1 wherein the 16 tape head elements of the write head of the interior module comprises 16 write elements arranged across an approximately 0.25 inch span of the magnetic gap in a format of 2 groups of 8 write elements.

* * * * *